Patented Dec. 30, 1930

1,787,145

UNITED STATES PATENT OFFICE

LEON B. CONANT, OF CAMBRIDGE, MASSACHUSETTS, ASSIGNOR, BY MESNE ASSIGNMENTS, TO STANDARD PATENT PROCESS CORPORATION, A CORPORATION OF MASSACHUSETTS

PROCESS OF VULCANIZING RUBBER TO LEATHER

No Drawing.   Application filed July 22, 1927. Serial No. 207,819.

Previous to my discoveries many attempts have been made to unite rubber to leather during vulcanization, but with indifferent success. Some have thought that by simply rendering the leather anhydrous, it thereupon became adapted to the process of hot vulcanization. Others, having dried the leather, have removed the greases as well. One, having freed the leather of all moisture, immediately enclosed it in an envelope to keep it anhydrous prior to and during the vulcanization of the rubber thereto. Another, aware of the moisture content of the rubber employed a stepped application of pressure to overcome its oxidizing effect upon the leather during vulcanization. Others have proposed to cement the contacting surfaces of the rubber and leather, and have theorized on the benefit to be derived therefrom during vulcanization, both cold and hot, but, if hot, always at a low temperature, that is to say 100° C., and withal, introducing the cemented leather in company with the rubber composition to the vulcanization process without suitable preparation.

I have demonstrated repeatedly that the above methods are not workable, since they leave the leather, after hot vulcanization, injured to a degree varying from brittleness to complete ruination that allows a finger touch to dissipate it.

After years of experimentation, I have discovered that the one way whereby rubber may be vulcanized with heat to leather, without injury to the latter, is by pre-heating the leather to approximate the temperature subsequently experienced during the vulcanization of the rubber composition thereto; and then, preferably, maintaining this pre-heating temperature, assemble the heated leather with the rubber composition and introduce both to the heat of vulcanization. In this manner, the pre-heating or heat-energizing of the leather prior to its introduction to the heat of vulcanization adapts the leather to accommodate itself readily to the heat of its union with the rubber composition during the hot vulcanization of the latter thereto.

I have further discovered that, while this pre-heating or heat-energizing of the leather in advance of its combination with the rubber composition by means of hot vulcanization, preferably with pressure, is indispensable and comprises much of the disclosure in my U. S. Patent 1,719,101, filed July 2, 1927, issued July 2, 1929, entitled Process of vulcanizing rubber to leather, an additional refinement or step is of the greatest importance to assure a positive and durable union between the contacting surfaces of the rubber composition and the leather by means of hot vulcanization. This step or refinement of process consists in the application to the leather of a coating of cement which has been suitably compounded to co-ordinate its curing with that of the rubber composition, and, whereby the cement being liquid penetrates beneath the surface of the leather and impregnates its pores and interstices to an appreciable depth, especially if the leather is provided with a split fibre surface to receive the cement.

Accordingly, in addition to the disclosure of process comprising U. S. Patent 1,719,101 aforesaid, wherein the leather is pre-heated or heat-energized to adaptation for the heat of its union with the rubber composition in advance of its assembly for the vulcanization thereof and, whereby, the leather is made to acquire a pre-vulcanization body-heat that substantially equals that degree which it later assumes during the vulcanization of the rubber composition thereto, this process requires that the leather be provided with a cement coat or veneer to receive the contacting surface of the rubber composition so that upon assembly of the cemented leather and rubber composition for the vulcanization the cement interposed between them impregnates the fibrous structure of the leather and engages the opposing surface of the rubber composition with which it is adapted to fuse and blend during the process of the vulcanization with heat and pressure and thereby guarantee to effect the union of the contacting surfaces of the rubber and leather inseparably.

Hence, this process is designed to provide the leather, in advance of its introduction in company with the rubber composition to the heat of hot vulcanization, not only with a body temperature of heat-energization whereby the leather is pre-heated to adaptation for hot vulcanization, but, also, with a coat or veneer of rubber composition cement suitably compounded to co-ordinate its cure with that of the rubber composition and thereby become the medium for securing the utmost union between the rubber composition and the leather during the process of hot vulcanization, preferably with pressure. Moreover, since, at the moment immediately preceding the assembly of the rubber composition with the cement coated leather, the body-heat thereof closely approximates that degree which it assumes upon introduction in company with the rubber composition to the process of hot vulcanization, whereby at the instance of the application of heat and pressure thereto the rubber composition becomes plastic because of the heat and as the pressure enforces its flow a tremendous friction occurs between the contacting surfaces of the leather and rubber so that in conjunction with the emission of the sulphur fumes laden with the vapor of the normal atmospheric moisture content of the rubber composition, a further impregnation of the cement into the leather obtains as well as its fusing and blending with the rubber composition, whereby, upon the completion of the process of vulcanization, the leather and rubber composition have become united together in a manner that assures a permanent and durable union thereof, thereby establishing this process as consisting in taking cement coated leather which has been heated to adaptation for hot vulcanization and while at approximately the same temperature uniting and vulcanizing rubber composition thereto. It is understood that the pre-heating or heat energizing of the leather protects and preserves it for the heat of vulcanization, and, that the leather when heated to adaptation for the hot vulcanization should experience no substantial change of temperature since it is now prepared and adapted to receive and accommodate the heat of its union with the rubber composition during hot vulcanization.

Therefore, it is understood that this process requires that the leather become both heat-energizd and provided with a cement coat in advance of its introduction in company with the rubber composition to the heat of hot vulcanization, whereby the certainty is established that the leather has become heated to adaptation so that the rubber composition may be hot vulcanized thereto, but, more, by means of the cement coat previously seated on the leather and interposed between it and the rubber composition as assembled together for the vulcanization, assurance is certain of uniting the rubber and leather together permanently, since the cement both impregnates the leather and blends and fuses with and becomes an integral part of the rubber composition during the process of hot vulcanization, preferably with pressure.

Accordingly, this process may be summarized as consisting in hot vulcanizing rubber composition to heat-energized cement coated leather.

What I claim as my invention is:

1. The process consisting in taking cement coated leather heated to adaptation for hot vulcanization and while at approximately the same temperature uniting and vulcanizing rubber composition thereto.

2. The process consisting in taking cement coated leather heated to adaptation for hot vulcanization and while heated uniting and vulcanizing rubber composition thereto.

3. The process consisting in taking cement coated leather heat-energized to adaptation for hot vulcanization and uniting and vulcanizing rubber composition thereto.

4. The process consisting in hot vulcanizing rubber composition to heat-energized cement coated leather.

5. The process consisting in vulcanizing rubber composition with heat and pressure to heat-energized cement coated leather.

6. The process consisting in hot vulcanizing rubber composition to cement coated leather heated to adaptation therefore.

7. The process consisting in hot vulcanizing rubber composition with pressure to cement coated leather heated to adaptation therefore.

In testimony that I claim the foregoing invention, I have hereunto set my hand this 13th day of July, 1927.

LEON B. CONANT.